Patented Aug. 26, 1952

2,608,563

UNITED STATES PATENT OFFICE 2,608,563

LANOLIN PRODUCTS

William C. Griffin, West Chester, Pa., assignor to Atlas Powder Company, Wilmington, Del., a corporation of Delaware No Drawing. Application March 24, 1949,
Serial No. 83,295

7 Claims. (Cl. 260—410.6)

This invention relates to lanolin products and particularly to lanolin products useful in cosmetic and related products.

An object of the invention is to provide a lanolin product which is completely soluble in mineral oils.

A further object of the invention is to provide a cosmetically acceptable lanolin product which is completely soluble in mineral oil.

The above and other objects will become more fully apparent in the course of the following description.

Lanolin and lanolin derivatives are valued ingredients of many cosmetic preparations, including lotions, creams, hair dressings and tonics, body oils, and the like. For certain uses, particularly in hair dressings and in baby oils, a simple solution of lanolin in a low or medium viscosity mineral oil would be of value. However, lanolin is not completely soluble in these mineral oils and in order to produce acceptable clear solutions the insoluble portion of the lanolin must be removed by filtration or other means.

By the present invention there are provided lanolin products which dissolve completely in concentrations up to 25% in low-to-medium viscosity mineral oils, yielding solutions of value as clear type hair dressings, baby oils and the like. The effect is accomplished by alcoholyzing anhydrous lanolin with a polyoxyethylene ether of a hexitol and esterifying the resulting alcoholysis mixture with sufficient oleic acid to react with all of the available hydroxyl groups. Instead of carrying out the process in two steps it has been found equally satisfactory to subject a mixture of lanolin, a polyoxyethylene ether of a hexitol and sufficient oleic acid to be equivalent to the total hydroxyl content of the two first named ingredients to simultaneous alcoholysis and esterification reactions whereby a mixed ester of lanolin alcohols and polyoxyethylene hexitol with lanolin acids and oleic acids is formed, which mixture is completely soluble in mineral oil.

The process is applicable to any of the several grades of lanolin although it is preferred, for cosmetic purposes, to use lanolin which meets the requirements of the United States Pharmacopoeia for anhydrous lanolin.

Polyoxyethylene ethers of hexitols useful in the present invention include those containing from 12 to 40 oxyethylene groups per mol of hexitol. Equally satisfactory are the complex mixtures of polyglycols and polyoxyethylene hexitols resulting from the addition of ethylene oxide to aqueous solutions of hexitols containing up to 20% water, wherein the weight proportion of ethylene oxide to hexitol solution lies between the inclusive limits of 2.9 to 1 and 9.7 to 1. Of the hexitols, sorbitol is preferred because of its ready availability, but other hexitols such as mannitol and dulcitol or mixtures of two or more hexitols can be used. The preferred polyoxyethylene ether is that mixture resulting from the addition of 7.25 parts of ethylene oxide to one part of an 85% solution of sorbitol in water. The polyoxyethylene ethers can be prepared by known methods such as those described in Patent No. 1,922,459 to Schmidt and Meyer.

The proportions of reactants to be used in preparing the oil soluble compositions of the present invention may vary over a considerable range. In general, it will be found that satisfactory products will be obtained when the weight of polyoxyethylene hexitol or mixture of polyoxyethylene hexitol and polyglycol is between about 0.75 and about two times the weight of lanolin taken, and the amount of oleic acid reacted therewith is about stoichiometrically equivalent to the hydroxyl content of the combined lanolin and oxyethylene derivative. When using the above described preferred polyoxyethylene ether the ratio of said ether to lanolin in the reaction mixture is preferably between about 1.0 and 1.2.

Preparation of compositions according to this invention is illustrated in the following examples, wherein the indicated parts are by weight.

Example I 943 parts of the mixed polyoxyethylene ether obtained by adding 480 parts of ethylene oxide to 100 parts of an 85% aqueous sorbitol solution and 1157 parts of commercial anhydrous lanolin were heated together in the presence of a small amount of sodium hydroxide as catalyst at a temperature of 270° C. for 3 hours. 740 parts of the resulting alcoholysis product were mixed with 660 parts of oleic acid, brought to a temperature of 250° C., in 100 minutes and held at that temperature for approximately 5 hours. After this time of heating the acid number had decreased to a substantially constant value of 16. The resulting lanolin product formed a completely clear solution at 25% concentration in mineral oil at room temperature, which became hazy upon cooling but cleared again on rewarming to room temperature.

Example II 207 parts by weight of the mixed polyoxyethylene ether obtained by adding 725 parts of ethylene oxide to 100 parts of an 85% aqueous sorbitol solution, 182 parts of commercial anhydrous lanolin, and 311 parts of oleic acid were charged into a reaction vessel with 2% of decolorizing carbon. The mixture was heated, under constant agitation, in an atmosphere of carbon dioxide at a temperature of 255° C. to an acid number of 10. This required 11 hours. The product after filtering and cooling was similar to lanolin in appearance and consistency, and formed clear solution in mineral oil.

Example III 483 grams of polyoxyethylene sorbitol produced by reacting 30 mols (1320 grams) ethylene oxide and 1 mol (182 grams) dry sorbitol, 373 grams anhydrous lanolin, and 544 grams oleic acid were heated together to 250° C., in the presence of 2% decolorizing carbon, and reacted for 5 hours 40 minutes at temperature. At the end of the reaction the product had an acid number of 11. After filtering, the product was similar to lanolin in appearance and consistency and formed clear solutions in mineral oil at room temperature and at concentrations of 10 and 25%.

The foregoing examples show some of the ways in which this invention can be practised. The process and product of Example II are preferred. It will be understood, however, that many other variations can be made within the scope of this disclosure and the following claims.

What is claimed is:

1. A lanolin product, soluble in mineral oil, comprising the interreaction product of lanolin, a polyoxyethylene ether of a hexitol, and oleic acid.

2. A lanolin product, soluble in mineral oil, comprising the complete oleate ester of the alcoholysis reaction between lanolin and a polyoxyethylene ether of a hexitol.

3. A lanolin product, soluble in mineral oil, comprising the interreaction product of lanolin, a polyoxyethylene ether, and oleic acid; wherein the polyoxyethylene ether is the mixture of compounds resulting from the addition of from 2.9 parts to 9.7 parts by weight of ethylene oxide to one part of a sorbitol component containing from 80% to 100% sorbitol and 20 to 0% water; wherein the weights of said polyoxyethylene ether and said lanolin stand in the ratio of from about 0.75 to about 2.0, and wherein the proportion of oleic acid is about stoichiometrically equivalent to the combined hydroxyl contents of the said polyoxyethylene ether and the lanolin.

4. A lanolin product as in claim 3 wherein the said polyoxyethylene ether is that formed by the addition of 7.25 parts of ethylene oxide to 1 part of an 85% aqueous sorbitol solution.

5. A lanolin product as recited in claim 4 wherein the weight ratio of said polyoxyethylene ether to said lanolin is about 1.1.

6. The process which comprises reacting lanolin, a polyoxyethylene ether of a hexitol, and oleic acid to produce a product having the appearance and consistency of lanolin together with solubility in mineral oil.

7. The process which comprises interreacting, at elevated temperature, lanolin, a polyoxyethylene ether, and oleic acid; wherein the said polyoxyethylene ether is the mixture of compounds resulting from the addition of from 2.9 to 9.7 parts by weight of ethylene oxide to one part of a sorbitol component containing from 80 to 100% sorbitol and 20 to 0% water, wherein the weights of said polyoxyethylene ether and said lanolin stand in the ratio of from about 0.75 to about 2.0, and wherein the proportion of oleic acid is about stoichiometrically equivalent to the combined hydroxyl content of the said polyoxyethylene ether and the lanolin.

WILLIAM C. GRIFFIN.

REFERENCES CITED

The following references are of record in the file of this patent:

UNITED STATES PATENTS

| Number | Name | Date |
|---|---|---|
| 2,450,079 | Brown | Sept. 28, 1948 |
| 2,457,139 | Fife et al. | Dec. 28, 1948 |
| 2,478,820 | Guffin | Aug. 9, 1949 |